United States Patent Office 3,271,144
Patented Sept. 6, 1966

3,271,144
SUPERSENSITIZED ZINC OXIDE
Ralph L. Clausen, South St. Paul, and Donald K. Meyer, West St. Paul, Minn., assignors to Minnesota Mining and Manufacturing Company, St. Paul, Minn., a corporation of Delaware
No Drawing. Filed Sept. 8, 1964, Ser. No. 395,362
10 Claims. (Cl. 96—1)

This application is a continuation-in-part of United States patent application Serial No. 158,526, filed December 11, 1961, and now abandoned.

This invention relates to the super sensitization of zinc oxide and its use as a photoconductor in the preparation of improved photoconductor sheets that are especially useful in the preparation of photoconductor sheets requiring sensitivity in all portions of the visible spectrum.

Dyes are conventionally added to zinc oxide mixtures used in the manufacture of photoconductor sheets in order to increase the sensitivity of the photoconductor to light. Such sensitization dyes increase the sensitivity of the zinc oxide in various regions of the visible light spectrum depending on the color of the sensitization dye, i.e. yellow dyes sensitize to blue light (around 435 millimicrons wavelength), magenta dyes sensitize to green light (around 550 millimicrons wavelength) and cyan dyes sensitize to red light (around 675 millimicrons wavelength). Dye sensitization with one or more dyes for each of these primary regions of the spectrum is required if the photoconductor is to be employed in the preparation of full color reproductions, as described in U.S. Patent Nos. 3,172,826 and 3,172,827 and U.S. Patent No. 3,130,655.

It has now been discovered that zinc oxide can be supersensitized by treatment with compounds having an aromatic thiazole nucleus prior to coating the zinc oxide dispersion onto the backing or sheet support. As used herein, "supersensitivity" refers to an increase in sensitivity to an extent far surpassing the expected sensitivity obtained from the use of sensitizing dye or dyes.

In accordance with this invention, the supersensitization of zinc oxide is accomplished when the zinc oxide surface contains, in addition to a sensitizing dye, a colorless complex of zinc (II) and a complexing agent having the structure

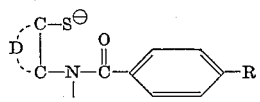

wherein R is a tertiary amino radical and D represents atoms completing an aromatic nucleus (e.g. benzene, napthalene, etc., including both unsubstituted or substituted, e.g. alkyl, alkaryl, etc., aromatic nuclei). The substituent on the nitrogen atom can be hydrogen, aryl, alkyl or alkaryl. Based on the weight of zinc oxide of a particle size ranging from 0.1 to 0.5 micron, at least 0.001%, preferably at least 0.01%, by weight of said complex is provided on the zinc oxide surface. Generally up to about 0.05% of the complex is preferred, although larger amounts, e.g. up to about 0.3%, may be used.

The colorless zinc complex which acts as supersensitizer on the zinc oxide particle surface may be obtained by preparing a dispersion of zinc oxide powder in an essentially nonpolar solvent medium, such as toluene, and adding a colored quaternary compound having the nucleus

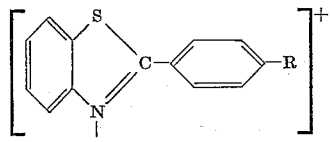

where R is a tertiary amino radical. A particularly preferred quaternary compound is 2-(4-dimethylaminophenyl)-3,6-dimethylbenzothiazolium chloride, otherwise known as the yellow dye, Seto Flavine T, which sensitizes zinc oxide at about 450 millimicrons wavelength in the light spectrum. Although the fact that this yellow dye sensitizes zinc oxide is to be expected, it has now been found that this preferred thiazolium dye reacts with alkali to give the ring-opened species or ligand

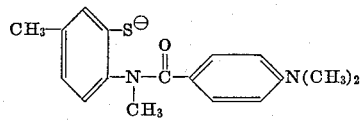

With the zinc oxide providing the alkalinity for ring-opening, the zinc (II) for complex formation, a colorless zinc complex having the following structure is formed

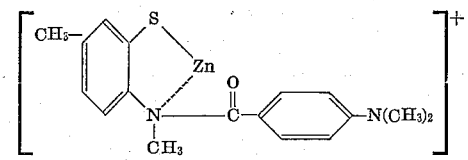

The other primary valence of the zinc is supplied by the zinc oxide matrix or a second like ligand. A minor amount of the colorless disulfide may also be formed from oxidation of the ring-opened species or ligand. The zinc complex is essentially a 1:1 complex, although some 2:1 complex (2 mols complexing agent:1 mol zinc) may also be formed.

Since white photoconductor sheets are essential in full color image reproduction, it is not only important to provide a sufficiently high concentration level of the colorless zinc complex on the zinc oxide particle surface but also to eliminate any visible residue of the unreacted thiazolium dye. This can be achieved by extended mixing or ball milling of the zinc oxide dispersion, either with or without the presence of a resinous binder, until essentially all of the thiazolium dye has been converted into colorless zinc (II) complex with corresponding disappearance of the color. At least six hours, usually from 8 to about 10 hours, of ball milling is generally required, followed by allowing the dispersion to stand for some added time, until the characteristic color of the dye has disappeared and the dispersion is fully "aged," although the actual length of time depends to some extent on the particular binders present, which tend to impede the progress of the reaction, and the solvent used. The ageing can also be accelerated if the dispersion is blended or allowed to stand without agitation at elevated temperatures. Once the zinc oxide dispersion is coated onto a sheet backing and dried, thus forming a useful photoconductor sheet, the "ageing" process is effectively halted. The sensitizing dye or dyes may be added to the zinc oxide dispersion before, during or after the "ageing" process, although it is preferable to delay their addition until all of the unreacted, colored thiazolium compound has been converted to colorless species as mentioned earlier. By the obvious expedient of appropriately selecting a blend of sensitizing dyes which together appear gray to black when admixed, as described in U.S. 3,051,569, the final photoconductor sheet coating has the desired essentially white or slightly off white appearance in addition to the enhanced sensitivity provided by the supersensitizer, i.e. the zinc complex.

The art of supersensitization in the field of silver halide photography is a known phenomenon that has received much attention without being fully and satisfactorily explained. This invention is believed to constitute the useful supersensitization of zinc oxide, permitting sheets of comparable sensitivity to be made with lesser amounts of dye sensitizers and without adding further undesirable colored materials onto the surface of the zinc oxide particles. Essentially uncolored, i.e. white, zinc oxide particels containing supersensitizer can be prepared and stored for subsequent use in the manufacture of coating dispersions with the addition of binder and one or more sensitizing dyes. Photoconductor sheets prepared from such zinc oxide are characterized by the significantly greater sensitivity, permitting a reducton in exposure time. For instance, in the production of full color reproductions by the methods of electrolytic electrophotography, one process requires three exposure steps for each print. Each second the exposure time can be reduced by supersensitization in all of the primary regions of the spectrum reduces the production time of each print by three seconds. At least a threefold increase in speed can be achieved. The greater sensitivity also permits the reproduction of images from cathode ray tubes with a more practical exposure time.

The following examples are presented for purposes of illustrating the invention.

*Example 1*

A zinc oxide dispersion was made by mixing a butadiene-styrene binder (1680 gm. of a 30% by weight toluene solution of a copolymer consisting of 30 parts by weight butadiene and 70 parts by weight styrene), toluene (1104 gm.) and zinc oxide USP–12 (1915 gm.) for one-half hour in a 1-gallon Waring Blendor at 107° F. After standing, the dispersion was filtered through coarse sintered glass filters. (All operations were carried out in lighting from Safelights equipped with Eastman Kodak OC filters.)

The zinc oxide dispersion (200 gm.) was added to each of vessels 1 to 12. Vessels 1 to 8 contained sensitization dyes as follows:

Vessel No.:
1 _____ 1 cc. .2% Phloxine B. in methanol.
2 _____ 2 cc. saturated solution at 70° F. of yellow dye S1334 Pina, a product of Farbwerke Hoechst, Germany, in methanol.
3 _____ 1 cc. 2% Alphazurine 2G in methanol.
4 _____ 4 cc. of panchromatic dye mixture.[1]
5 _____ 2 cc. of a 2% methanol solution of Seto Flavine T Supra and 1 cc. .2% Phloxine B. in methanol.
6 _____ 2 cc. of a 2% methanol solution of Seto Flavine T Supra and 2 cc. of S1334 in methanol (saturated at 70° F.).
7 _____ 2 cc. of a 2% methanol solution of Seto Flavine T Supra and 1 cc. of .2% Alphazurine 2G in methanol.
8 _____ 2 cc. of a 2% methanol solution of Seto Flavine T Supra and 4 cc. of panchromatic dye mixture.[1]

[1] See footnote below.

Vessels 9, 10, 11 and 12 each contained 2 cc. of a 2.0% methanol solution of Seta Flavine T Supra. After sitting 16 hours to permit formation of the zinc complex, sensitization dyes were added to the vessels as follows:

Vessel No.:
9 _____ 1 cc. of a .2% Phloxine B in methanol.
10 _____ 2 cc. saturated solution at 70° F. of S1334 in methanol.
11 _____ 1 cc. of .2% Alphazurine 2G in methanol.
12 _____ 4 cc. of panchromatic dye mixture.[1]

[1] The panchromatic dye mixture was prepared by mixing the following solutions:
10 cc. of a .2% solution of Alphazurine 2G in methanol;
10 cc. of a .2% solution of Phloxine B in methanol;
20 cc. of saturated solution of S1334 in methanol at 70° F.

Coatings (1.5 mil dry thickness) of the sensitized dispersions in vessels 1 to 12 were placed on aluminum foil.

After storing vessels 1 to 12 in the dark for 24 hours, a second set of photoconductor sheets were prepared by coating the dispersions again on aluminum foil. (All coating operations were done under Eastman Kodak OC Safelighting to avoid any exposure to tungsten light at any time from the beginning to the end of the tests.)

Color prints using the Cyan dye, a polyamine derivative of copper phthalocyamine, as taught on p. 20 and p. 21 of U.S. Serial No. 23,017, filed April 18, 1960, and the above photoconductor sheets were made with a spectrograph at a 4 second exposure to the light source followed by a 10 second development at 30 volts, with 15 seconds delay between the end of the exposure and the application of the plating current. The spectrograph consisted of a collimated light source illuminating a slit approximately .003 wide by 5/8 long. This slit was focused on the photoconductor sheet after going through high quality prisms which produce a spectrum on a 4"×5" area. Transverse to the spectrum is placed an EK step wedge which gives a graduated exposure for each increment of the spectrum. Calibration of the spectrograph was achieved by using interference filters every 50 millimicrons and then rechecking using sharp cutting EK gelatin filters. A piece of didynium glass was also placed on the step wedge to give reference marks on every exposure to insure that there was no long-term drift or instability.

By this technique, the areas of sensitivity on the photoconductor as evidenced by image development in the sensitized areas were shown to be significantly greater on those sheets treated with dispersions having been prepared with the addition of Seto Flavine T Supra. (Vessels Nos. 5–12.) The results on each of the photoconductor sheets prepared from the dispersions of vessels 5–12 indicated that all of the sensitized areas had been supersensitized.

*Example II*

A zinc oxide dispersion was prepared in a Waring Blendor as follows:

(1) Toluene (151 grams); USP–12 zinc oxide (252 grams) and 2% methanol solution of Seto Flavine T Supra (6 cc.) were mixed thoroughly.

(2) Toluene (26 grams) was added and the mixture slurried.

(3) Methanol (20 grams) was added.

(4) Pliolite S–7, a product of the Goodyear Tire and Rubber Co., Akron, Ohio (210 grams) was added as the binder.

(5) The mixture was blended for 15 minutes with no cooling, thereby boiling off 35 grams of methanol and toluene at which time the yellow color due to the Seto Flavine T Supra had disappeared and the zinc complex had been formed.

To this dispersion was added a saturated methanol solution at 70° F. of yellow dye S1334 Pina (6 cc.); 1% methanol solution of Alphazurine 2G (6 cc.) and 1% solution of Phloxine B (0.6 cc.). After being filtered through coarse, sintered glass, an additional 6 cc. of the yellow dye solution was added and the mixture refiltered through coarse, sintered glass. The dispersion was coated on an aluminum sheet immediately. The resulting white photoconductor sheet was supersensitized and had a speed comparable to the analogous sheets of Example 1.

*Example III*

Zinc oxide (2016 gm.), methanol (160 gm.) and toluene (1435 gm.) were placed in a jar and slurried. A 2.0% methanol solution of Seto Flavine T Supra (48 cc.) was added, and the jar was tumbled on a ball mill for 26 hours. At this time, the yellow color of the Seto Flavine T Supra was nearly gone and the zinc complex had been formed.

*Example IV*

Zinc oxide, toluene and methanol were used to make a ZnO slurry. Seto Flavine T Supra, 2.0% in methanol, was added to the slurry, and the dispersion was blended fifteen minutes at high speed. The temperature reached 178° F. and boiled off some solvent. The yellow color disappeared from the dispersion in less than 10 minutes, indicating essentially complete formation of the zinc complex from the Seto Flavine T.

*Example V*

Preparation of 2-(4-diethylaminophenyl)-3-ethyl-6-methylbenzothiazolium p-toluenesulfonate and its use as a supersensitizer.

Dehydrothio-p-toluidine (12.0 g., 0.05 mole), ethyl p-toluenesulfonate (22.0 g., 0.11 mole), potassium carbonate (7.6 g., 0.055 mole) and o-dichlorobenzene (150 ml.) were stirred and refluxed for 12 hours. The reaction mixture was filtered while hot, and the filter cake was washed with dichlorobenzene. The filtrate was diluted with heptane (700 ml.) and cooled. The resulting solution was decanted from a dark viscous liquid which separated, and filtered. The filtrate was saturated with hydrogen chloride which precipitated a pale yellow solid. The solid was collected by filtration, washed with petroleum ether, and dispersed in water (200 ml.) and made basic with ammonium hydroxide. The product was collected by filtration and thoroughly washed with water. The wet solid was then crystallized from methanol to yield crystals of 2-(4-diethylaminophenyl)-6-methylbenzothiazole.

2-(4-diethylaminophenyl)-6-methylbenzothiazole (4.9 g., 0.017 mole) as prepared above, and ethyl p-toluenesulfonate (5.0 g., 0.025 mole) were mixed and heated at 150° C. for 45 minutes. After cooling, the semi-solid was extracted twice with toluene. The yellow solid remaining was washed with petroleum ether and crystallized from a hot pyridine solution by the addition of heptane and cooling of the solution to yield solid 2-(4-diethylaminophenyl)-3-ethyl-6-methylbenzothiazolium p-toluenesulfonate (M.P. 142–4). The zinc complex formed when this compound was reacted with zinc oxide supersensitized a zinc oxide photoconductor sheet when used in combination with Phloxine B.

*Example VI*

A. Preparation of 2-(4-dibenzylaminophenyl)-6-methylbenzothiazole.

A mixture of dehydrothio-p-toluidine (12 g., 0.05 mole), benzyl chloride (20.2 g., 0.16 mole), potassium carbonate (6.9 g., 0.05 mole), a few crystals of potassium iodine, and o-dichlorobenzene (150 ml.) was heated to just below its boiling point with stirring for 36 hours under a steam jacketed condenser. The mixture was filtered hot, and the filter cake was washed with a dichlorobenzene. The filtrate was diluted with heptane (600 ml.) and cooled in ice. It was then seeded with dehydrothio-p-toluidine and the small amount of dark solid which separated was removed by filtration. The filtrate was saturated with hydrogen chloride and a yellow solid separated. This solid was collected by filtration and washed with petroleum ether. After it had dried, it was dissolved in hot ethanol (400 ml.) and filtered. The filtrate was made basic by the addition of ammonium hydroxide (20 ml., 0.3 mole) and diluted with water (400 ml.). The product separated as a tan solid. The mixture was filtered and the filter cake was washed several times with water and dissolved in hot pyridine (60 ml.). Methanol (50 ml.) was added and the solution cooled. The resulting crystals of 2-(4-dibenzylaminophenyl)-6-methylbenzothiazole, after being washed with cold methanol and dried, weighed 5.7 g., and had a melting point of 192–5° C.

B. Preparation of 2-(4-dibenzylaminophenyl)-3-benzyl-6-methyl-benzothiazolium bromide and its use as a supersensitizer.

A mixture of 2-(4-dibenzylaminophenyl)-6-methylbenzothiazole (4.0 g., 0.01 mole) and benzyl bromide (10 g., 0.06 mole) was heated at 200–10° for 30 minutes. After cooling, the mixture was diluted with ethyl ether. The solid which separated was collected by filtration and was washed thoroughly with toluene. The crude, dry product was dissolved in hot ethanol (40 ml.) and this solution was diluted with isopropyl ether (25 ml.). A gum separated on cooling which was again dissolved in hot ethanol (40 ml.) and isopropyl ether (20 ml.). On cooling a gum separated which solidified upon agitation. The solid product, after being washed with isopropyl ether and dried, weighed 1.5 gm. and had a melting point of M.P. 161–3°. The zinc complex formed by reacting this compound, 2-(4-dibenzylaminophenyl)-3-benzyl-6-methylbenzothiazolium bromide, with zinc oxide was found to supersensitize zinc oxide photoconductor materials containing Phloxine B sensitizer.

*Example VII*

Preparation of 2-(4-dimethylaminophenyl)-3,6-dimethylbenzothiazolium p-toluenesulfonate and its use as a supersensitizer.

2-(4 - dimethylaminophenyl) - 3,6 - dimethylbenzothiazolium chloride (1.5 g.) was dissolved in water (20 ml.) with heating. p-Toluene-sulfonic acid (1 g.) was added. An oil separated which solidified on cooling. The mixture was cooled in an ice bath and the product collected by filtration. It was then washed with cold water and dried. The product, 2-(4-dimethylaminophenyl)-3,6-dimethylbenzothiazolium p-toluenesulfonate, after crystallization from pyridine (15 ml.) weighed 0.9 g. and had a melting point of 211–7°. This compound was found to form a zinc complex supersensitizer for zinc oxide photoconductor sheets containing Phloxine B sensitizer.

*Example VIII*

A panchromatic dye mixture was prepared by mixing the following dyes:

5 cc. of 0.2% methanol solution Alphazurine 2G.

9 cc. of 0.2% methanol solution of Phloxine B.

14 cc. of 0.2% methanol solution of the triethylamine salt of 3-carboxymethyl-5-(3-ethyl-2-(3)-benzothiazolylidene) rhodanine.

A zinc oxide photoconductor dispersion containing: Toluene (95.9 gm.), zinc oxide (68.5 gm.) and Pliolite S7 (35.6 gm.), 1.35 cc. of the panchromatic sensitizer dye mixture and the indicated amounts of Seto Flavine T Supra.

The dispersion was coated on aluminum foil and the dry coating thickness of the zinc oxide layer was 0.9 to 1 mil.

The table below shows the effectiveness of the zinc complex formed from Seto Flavine T Supra as a supersensitizer in the above formulation. All exposures were from a 1500 watt tungsten light source.

|   | Red Speed (1) | Green Speed (2) | Blue Speed (3) | Red Gamma | Green Gamma | Blue Gamma | Amount Seto Flavine T. Supra Added (4) |
|---|---|---|---|---|---|---|---|
| A | 1.66 | 1.69 | 1.47 | 1.62 | 1.2 | 1.68 | 0 |
| B | 1.46 | 1.50 | 1.28 | 2.3 | 1.63 | 2.21 | .00482 |
| C | 1.3 | 1.38 | 1.2 | 2.33 | 1.9 | 2.55 | .00964 |
| D | 1.16 | 1.27 | 1.10 | 2.73 | 2.3 | 2.82 | .0178 |
| E | 1.02 | 1.15 | .92 | 3.44 | 2.42 | 2.87 | .0356 |
| F | 1.3 | 1.48 | 1.08 | 2.2 | 1.65 | 2.5 | .0713 |

[1] 23.8 second exposure—#92 Wratten filter.
[2] 3.8 second exposure—#99 Wratten filter.
[3] 11.7 second exposure—#98 Wratten filter.
[4] CC.'s of 2% by weight Seto Flavine T Supra per gram of zinc oxide.

All calculations were plotted from continuous wedge curves obtained by running samples through the reflection head of a Quantascan Automatic Densitometer model 101, Quantometric Devices, Inc., Binghamton, N.Y.

Speed points were measured by extending the tangent of the straight line portion of the curve to the "0" density base line. The numbers given are therefore values of log $e$. This means that a reported speed difference of —.3 corresponds to an approximate doubling of the ASA speed.

Generally speaking, the photoconductor sheets of this invention will comprise a zinc oxide binder layer of 0.5 to 2 mil thickness on a conductive backing such as metal film or a metalized flexible sheet. The photoconductor layer will preferably contain a zinc oxide to binder ratio of 3 to 8 parts by weight of zinc oxide to each part by weight of binder solids.

We claim:

1. A supersensitized zinc oxide dispersion suitable for use in the preparation of photoconductor sheet materials which comprises an admixture prepared from zinc oxide, binder, sensitizing dye and at least 0.001 percent, based on the weight of said zinc oxide, of a compound having the nucleus

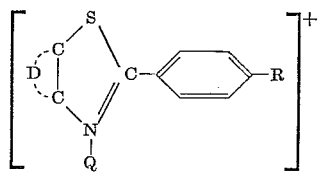

wherein D represents atoms completing an aromatic ring, R is a tertiary amino group and Q is hydrogen, aryl, alkyl or alkaryl, said dispersion having substantially no color attributable to said compound due to the conversion thereof into a colorless zinc (II) complex of

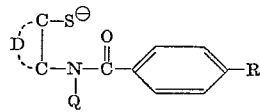

wherein D, Q and R are as above defined.

2. Photoconductor sheet materials obtained by coating a backing with a dispersion of claim 1.

3. The dispersion of claim 1 in which Q is methyl, R is N,N-dimethyl amino and D forms the aromatic ring

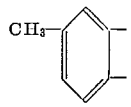

4. Photoconductor sheet materials obtained by coating a backing with a dispersion of claim 3.

5. Zinc oxide particles having on the surface thereof at least 0.001 percent, based on the weight of zinc oxide, of the colorless zinc (II) complex of

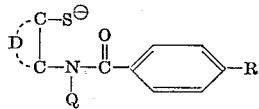

wherein D represents atoms completing an aromatic ring, R is a tertiary amino group and Q is hydrogen, aryl, alkyl or alkaryl, said zinc oxide particles having substantially no color attributable to the presence of a dyestuff containing the nucleus

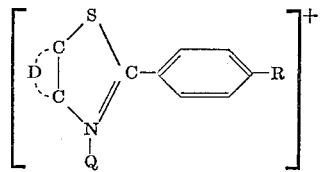

wherein D, Q and R are as above defined.

6. The zinc oxide particles of claim 5 in which said colorless zinc (II) complex is a complex of

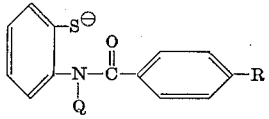

7. The zinc oxide particles of claim 5 in which said colorless zinc (II) complex is a complex of

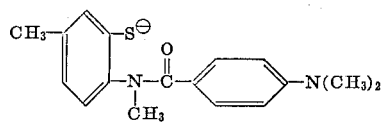

8. A photoconductor copysheet containing, as photoconductor particles, the zinc oxide particles of claim 5.

9. A photoconductor copysheet containing, as photoconductor particles, the zinc oxide particles of claim 6.

10. A photoconductor copysheet containing, as photoconductor particles, the zinc oxide particles of claim 7.

References Cited by the Examiner

UNITED STATES PATENTS 3,052,540   9/1962   Greig _____ 96—1

NORMAN G. TORCHIN, *Primary Examiner.*

C. VAN HORN, *Assistant Examiner.*

UNITED STATES PATENT OFFICE
CERTIFICATE OF CORRECTION

Patent No. 3,271,144                                September 6, 1966

Ralph L. Clausen et al.

It is hereby certified that error appears in the above numbered patent requiring correction and that the said Letters Patent should read as corrected below.

Column 3, line 4, for "particels" read -- particles --; line 9, for "reducton" read -- reduction --; column 6, in the table, in the heading to the last column, for "( )" read -- $(^4)$ --.

Signed and sealed this 1st day of August 1967.

(SEAL)
Attest:

EDWARD M. FLETCHER, JR.                        EDWARD J. BRENNER
Attesting Officer                                       Commissioner of Patents